U. F. HEINECK.
MOTOR HANDLE SHIELD.
APPLICATION FILED MAY 29, 1916.

1,214,032.

Patented Jan. 30, 1917.

Witnesses:

Urban F. Heineck,
Inventor,
By R. C. Wright
Atty.

UNITED STATES PATENT OFFICE.

URBAN F. HEINECK, OF PORTLAND, OREGON.

MOTOR-HANDLE SHIELD.

1,214,032.　　　　　　Specification of Letters Patent.　　Patented Jan. 30, 1917.

Application filed May 29, 1916. Serial No. 100,591.

*To all whom it may concern:*

Be it known that I, URBAN F. HEINECK, a citizen of the United States, residing at Portland, in the county of Multnomah and State of Oregon, have invented a new and useful Improvement in Motor-Handle Shields, of which the following is a specification, reference being had to the accompanying drawings.

My invention relates to that class of devices used upon the handles of motorcycles, bicycles, and other vehicles, to protect the hands.

The object of my invention is to provide a device of the character mentioned, which is easily adjustable about the handle and can be retained thereon in operative position, rolled about the handle bar when not in use, or can be rolled together compactly for storage.

I attain these objects as well as other advantages, by the construction, combination and arrangement of parts illustrated in the accompanying drawings which form a part hereof.

Figure 1:
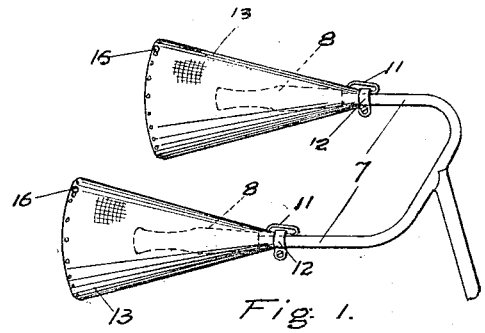
Figure 3:
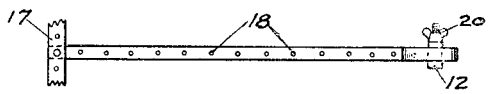
Figure 4:
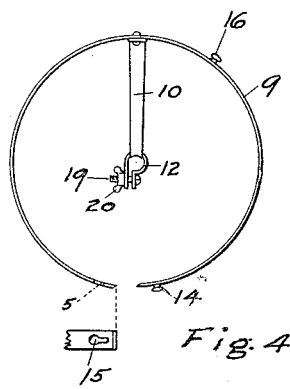
Figure 2:
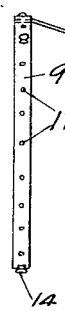
Figure 5:
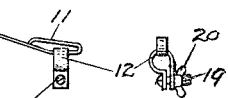
Figure 6:
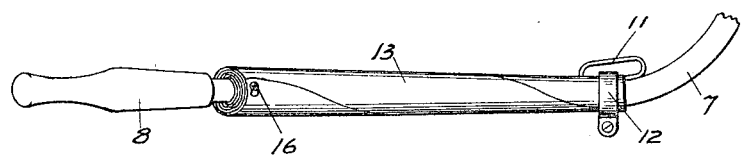

Figure 1 is a perspective view of my device in operative position on the handles of a motor vehicle handle bar. Fig. 2 is a side view of the end spring, supporting bar and fastener. Fig. 3 is a plan view of parts shown in Fig. 2 with portion of spring broken away. Fig. 4 is an end view of parts shown in Fig. 3 and plan view in extension of spring opening for fastener. Fig. 5 is an end view of fastener in operative position. Fig. 6 is a perspective view showing the device slipped over the handle, rolled about the handle bar and secured.

Like numerals herein refer to like parts in each view.

The device is shown in Fig. 1 secured upon the handle bars 7, of a type applicable to an ordinary motorcycle or bicycle. The bars have handles 8. The hand-shield is composed of a circular spring 9, to the upper part of which one end of a bar 10 is rigidly secured, the bar 10 having an eye 11 in its opposite end to that above mentioned, a fastener 12 and a conical shaped covering 13. The spring 9 has a button 14 near one end and a receiving opening 15 near its opposite end for the button. There is also a second button 16 on the spring near its upper part. The spring 9 has small openings 17 to allow the cover 13 to be secured to it. The bar 10 has similar openings 18 for a like object. The fastener 12 has a securing bolt 19 and thumb nut 20. The larger end of the cover 13 is secured to the spring 9.

It will now be seen that in order to place my device in operative position the button 14 is secured in the opening 15. The free end of the cover 13 is slipped over the handle to a desired position on the bar and through the fastener 12. The fastener however, is first placed within the eye 11 of the bar 10. Then the ends of the cover and the eye end of the bar 10 are secured in a desired position on the handle bar 7 by means of the fastener 12. This secures the device in operative position as shown in Fig. 1. When it is desired to cease using the device, the button 14 is released from the button opening 15 and the cover folded with the spring until the button opening 15 can be slipped over the button 16. The fastener is adjusted to retain the end of the cover at a suitable position so that the whole device is secured beyond the handle upon the handle bar 7. The device may also be removed and rolled up, as described, for storage.

It is apparent that my device can be made cheaply and can be quickly adjusted to operative position, moved out of the way or stored. In the respects shown herein it is clearly different from other devices proposed for the same object and is novel.

I contend that it will successfully and practically protect the hands from the cold air, rain or dust and thus leave a driver free to operate a motor machine without the impediment or possible danger incurred by the use of gloves.

Having thus described my invention I claim:—

1. A device of the character described, comprising a circular spring 9 having means to secure it in circular position or rolled up, a supporting bar 10 rigidly secured at one end to the spring, a conical shaped covering having its larger end secured upon the spring 9 and being longitudinally secured on the bar 10, substantially as described.

2. A device of the character described, comprising a circular spring 9 having means to secure it in circular position or rolled up, a supporting bar 10 rigidly secured at one end to the spring and provided with an eye in its opposite end, a conical shaped covering having its larger end secured upon the spring 9 and being longitudinally secured upon the bar 10, means to secure the ends of the bar 10 and covering upon a bar extending through the covering, substantially as described.

URBAN F. HEINECK.

Witnesses:
O. H. McPherson,
Geo. F. Felts.

Copies of this patent may be obtained for five cents each, by addressing the "Commissioner of Patents, Washington, D. C."